Figure 1:
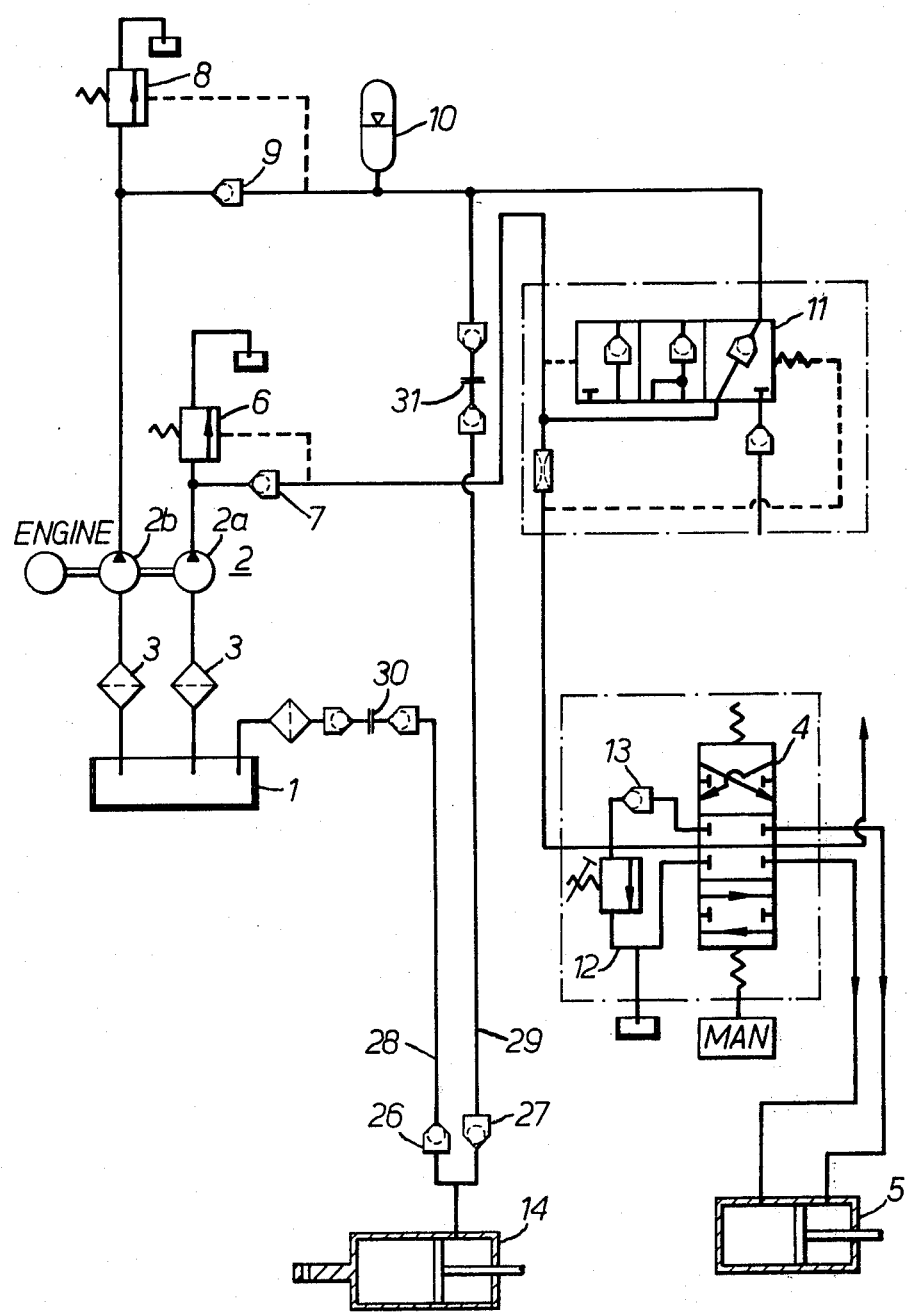

United States Patent [19]

Wall et al.

[11] 4,243,115
[45] Jan. 6, 1981

[54] DRAW BAR UNIT

[75] Inventors: Christopher Wall; Ronald Scaife, both of Wakefield, England

[73] Assignee: Dresser Europe S.A., Brussels, Belgium

[21] Appl. No.: 26,208

[22] Filed: Apr. 2, 1979

[51] Int. Cl.³ .................. B62D 5/10; B60D 7/02
[52] U.S. Cl. .................... 180/165; 180/133; 280/444; 280/486
[58] Field of Search .............. 280/444, 445, 483, 486, 280/773; 417/3; 180/14 R, 14 C, 14.5, 133, 165; 60/404, 405, 403

[56] References Cited

U.S. PATENT DOCUMENTS

| 3,635,300 | 1/1972 | Gibbs | 180/14 A |
| 3,719,249 | 3/1973 | Becker et al. | 180/133 |
| 4,040,507 | 8/1977 | Reise | 180/14 R |
| 4,076,096 | 2/1978 | Hushower et al. | 180/133 |

FOREIGN PATENT DOCUMENTS 1283063  7/1972  United Kingdom .
1367557  9/1974  United Kingdom .

*Primary Examiner*—John J. Love
*Assistant Examiner*—Donn McGiehan
*Attorney, Agent, or Firm*—Larson, Taylor and Hinds

[57] ABSTRACT

A draw bar unit for connecting a recovery vehicle to a vehicle having a pressure fluid operated steering system of the stored energy kind in cases of failure of the normal pressurizing means of the system, incorporates auxiliary pressurizing means connectible into the pressure fluid circuit of the disabled vehicle and operable in response to relative movement between the vehicles to pressurize the pressure fluid circuit.

6 Claims, 2 Drawing Figures

DRAW BAR UNIT

The present invention relates to draw bar units.

Industrial rubber tired vehicles which require a high degree of manoeuverability often employ the pivot steer principle and four-wheel drive. Where a high angle of steer is required at the pivot, even with a moderate weight and size of vehicle, a considerable force is required to steer the vehicle to full lock at low travel speeds. This force is usually applied by using hydraulic cylinder and piston units powered by hydraulic oil from an engine driven pump.

For use in the event of failure of the engine or pump which provides the hydraulic power to the steering system, emergency steer is often a legal requirement to bring the vehicle safely to a standstill.

One method of achieving this is to store hydraulic energy in a hydro-pneumatic accumulator for limited emergency use at normal steering speeds.

However, if the vehicle is to be used in a confined space e.g. underground mines, factory aisles, stores, stockyards ect. it will generally be necessary to tow a disabled vehicle away from the working area for repair and if, as will often be the case, the vehicle must be tow manoeuvered through many restricted corners, the provision of an accumulator will not be sufficient.

According to the present invention, a draw bar unit for connecting a recovery vehicle to a vehicle having a pressure fluid operated steering system of the stored energy kind in cases of failure of the normal pressurising means of the system, incorporates auxiliary pressurising means connectible into the pressure fluid circuit of the disabled vehicle and operable in response to relative movement between the vehicles to pressurise said pressure fluid circuit.

The purpose of this is to allow any towing vehicle, with sufficient tractive effort, to recharge the steering system of the disabled vehicle. It is appreciated that the driver of the disabled vehicle could use a manually operated pump to restore the energy in the accumulator but this would be physically exhausting and slow if the towed vehicle required much steering.

Thus the invention enables the accumulator of the disabled vehicle to be recharged by braking the disabled vehicle and moving the towing vehicle backwards and forwards.

The term "draw bar" is used herein to include both a tow bar for use in connecting a recovery vehicle to a disabled vehicle so as to tow the disabled vehicle and a push bar for use in connecting a recovery vehicle to the rear of a disabled vehicle to push the disabled vehicle from behind.

The invention may be performed in various ways and one preferred embodiment will now be described by way of example, with reference to the accompanying drawings in which:-

Figure 2:
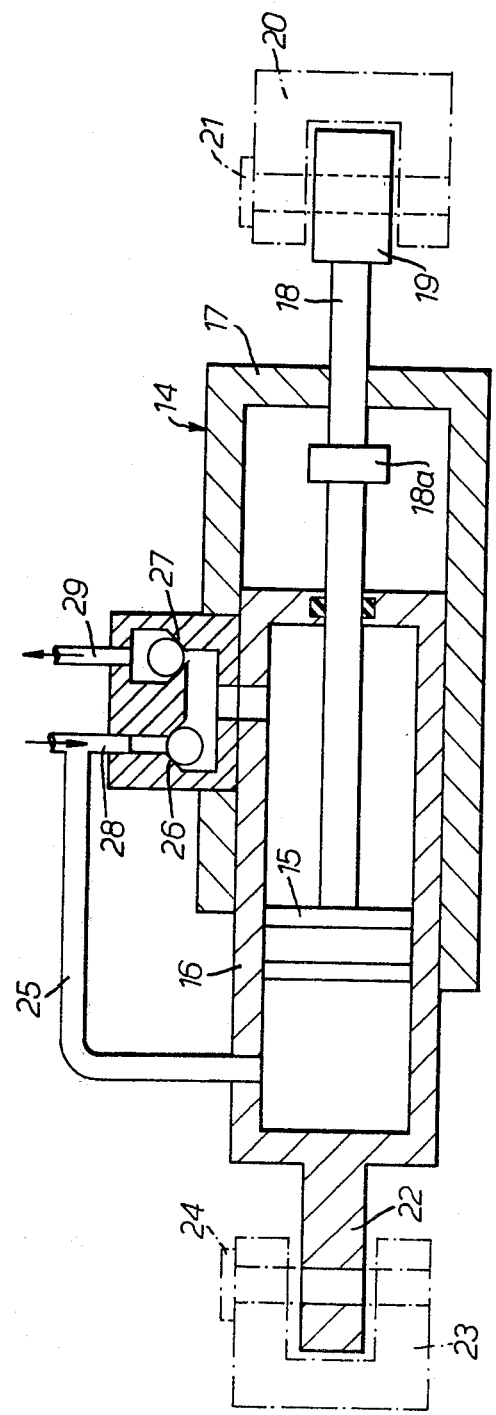

FIG. 1 is a hydraulic diagram of a typical steering system of a pivot steered vehicle using a hydropneumatic accumulator, and FIG. 2 shows a preferred construction of draw bar unit of the invention.

Referring to FIG. 1, the system includes an hydraulic reservoir 1 from which oil is pumped by an engine driven tandem gear pump unit 2 to a steering cylinder actuating valve 4 connected to a double acting steering cylinder 5. The oil leaving the reservoir is drawn through suction filters 3. The valve 4 is manually operated as indicated, and operation of the valve pressurises the steering cylinders 5 in one sense or the other depending upon the desired direction of steer.

One of the pumps (2a) of the unit 2 supplies the valve 4 direct except for the provision of a relief valve 6 and associated check valve 7 for a purpose to be described later, whereas the other pump (2b) in addition to being provided with a second relief valve 8 and associated check valve 9, supplies an hydraulic accumulator 10 and is connected to the valve 4 through a demand valve 11. The purpose of the valves 6 and 8 is to relieve pump pressure during times of low demand and to divert the oil flow to the reservoir 1 thus permitting the particular pump to idle. The purpose of the valve 11 is to control the variable output flow from the pump unit 2. The supply to the actuating valve 4 includes a further pressure relief valve 12 and check valve 13.

A draw bar unit 14 for connection between a recovery vehicle and the vehicle having a steering system as shown in FIG. 1 in cases of failure of the vehicle engine, gear box or final drive, the pump unit 2 or of any other component of the hydraulic circuit upstream of the check valves 7 and 9, is illustrated in FIG. 2 and is shown diagrammatically in FIG. 1.

The unit 14 comprises a piston and cylinder device 15, 16, the cylinder 16 of which is mounted in a housing 17 through which the rod 18 of the piston extends. At the free end of the rod 18 an eye 19 is formed for connection to the usual clevis 20 of a recovery vehicle by means of a linch pin 21. A stop 18a is provided on the rod 18 intermediate the cylinder and the end wall of the housing. At the other end of the unit, the cylinder 16 is formed with a lug 22 which is apertured for connection to a clevis 23 on the disabled vehicle again by means of a linch pin (24). The chamber of the cylinder 16 to the right (in the drawing) of the piston is provided with suction and delivery check valves 26 and 27 and hoses 28 and 29 by means of which the draw bar unit is connectible into the hydraulic circuit of FIG. 1 through two self-sealing couplings 30 and 31. Furthermore a connection 25 is provided between the left hand chamber of the cylinder and the hose 28 for a purpose to be described later.

In operation, in the event of the failure mentioned above, a recovery vehicle is attached to the vehicle having the steering system of FIG. 1 by means of the draw bar unit 14 which is connected into the disabled vehicle's steering system as shown. Then by braking the disabled vehicle and by driving the recovery vehicle backwards and forwards, oil will be sucked from the reservoir 1 and pumped into the accumulator 10 to enable the disabled vehicle to be steered at least for a short time when the accumulator charging procedure may be repeated as necessary. The stop 18a enables the one vehicle to tow the other without imposing any load on the recharging section of the draw bar arrangement.

The valves 7 and 9 prevent oil pumped by the unit 14 from entering the pumps 2a, 2b.

The purpose of the connection 25 is to assist in boosting the flow of oil from the reservoir 1 to the unit 14. Furthermore, by connecting the non-active cylinder chamber to the hydraulic circuit, water is prevented from forming in this chamber leading to rust, which could otherwise be the case if this chamber is merely vented to the atmosphere by an air breather. The latter may be used though where the conditions are quite favourable.

It will be seen that the unit 14 provides a ready, efficient and convenient means of recharging the accumulator of the disabled vehicle. Whilst the unit has been described as a tow bar, the unit may readily be used as a push bar for use in connecting the front of a recovery vehicle to the rear of the disabled vehicle to propel the latter vehicle from the rear.

We claim:

1. A draw bar unit for attaching a recovery vehicle to a vehicle having a pressure fluid operated steering system of the stored energy kind in cases of failure of the normal steering system pressurising means, said draw bar unit incorporating auxiliary pressurising means connectible into the pressure fluid circuit of the steering system of the disabled vehicle and operable in response to reciprocating movement of one of the vehicles towards and away from the other to pressurise said pressure fluid circuit by a pumping action.

2. A unit as set forth in claim 1, in which the unit incorporates a piston and cylinder.

3. A unit as set forth in claim 2, in which the cylinder is provided with suction and delivery connections provided with suitably oriented check valves and both leading into a first chamber of the cylinder.

4. A unit as set forth in claim 3, in which the suction connection is also in communication with a second chamber on the opposite side of the piston to the first chamber.

5. A unit as set forth in claim 2, in which the cylinder is mounted in a housing through which a rod from the piston projects, the piston rod carrying a stop member between the end wall of the cylinder and a wall of the housing.

6. A unit as set forth in claim 5, in which the free end of the piston rod and a lug on the cylinder at the other end of the unit are each formed with an eye for connection to a clevis on the recovery vehicle or the disabled vehicle as the case may be.

* * * * *